United States Patent
Hagedorn et al.

(10) Patent No.: US 8,272,990 B2
(45) Date of Patent: Sep. 25, 2012

(54) PLANET WHEEL WITH A BEARING BOLT THAT PRESENTS AN AXIAL GROOVE

(75) Inventors: Heinz Gert Hagedorn, Rottweil (DE); Erkan Poyraz, Donauschingen (DE); Thomas Riester, Villingen-Schwenningen (DE)

(73) Assignee: IMS Gear GmbH, Donaueschingen (DE)

( * ) Notice: Subject to any disclaimer, the term of this patent is extended or adjusted under 35 U.S.C. 154(b) by 272 days.

(21) Appl. No.: 12/635,120

(22) Filed: Dec. 10, 2009

(65) Prior Publication Data
US 2010/0212445 A1    Aug. 26, 2010

(30) Foreign Application Priority Data
Feb. 23, 2009    (DE) .................. 10 2009 010 001

(51) Int. Cl.
*F16H 57/08*    (2006.01)
(52) U.S. Cl. ....................... 475/331; 475/348
(58) Field of Classification Search .................. 475/348
See application file for complete search history.

(56) References Cited

U.S. PATENT DOCUMENTS

| | | | | |
|---|---|---|---|---|
| 4,222,290 A * | 9/1980 | Helmer et al. | ................ | 475/159 |
| 2009/0253545 A1* | 10/2009 | Diosi et al. | ................ | 475/159 |

FOREIGN PATENT DOCUMENTS

| | | |
|---|---|---|
| CN | 101074718 | 11/2007 |
| DE | 590 886 | 12/1933 |
| DE | 22 34 488 A1 | 1/1973 |
| DE | 2234488 | 1/1973 |
| DE | 27 02 321 A1 | 1/1977 |
| DE | 2702321 A1 | 7/1978 |
| DE | 10 2006 023 380 A1 | 11/2007 |
| DE | 10 2006 023390 A1 | 11/2007 |
| DE | 102006023380 A1 | 11/2007 |
| DE | 102006023390 A1 | 11/2007 |
| EP | GB1550789 | 8/1979 |
| EP | 2 221 510 A1 | 8/2010 |
| JP | 62007972 A | 1/1987 |

OTHER PUBLICATIONS

German Office Action issued Sep. 25, 2009 for Appln. Serial No. DE 10 2009 010 001.6-12 filed Feb. 23, 2009, 10 pages (translation).
EP Appln. No. 0901 4866.9 (for EP 2 221 510 A1) filed Dec. 1, 2009, Search Report, 3 pages.
Chinese Office Action issued mailed Apr. 20, 2012 for Appln. Serial No. 201010003801.5, 4 pages—Chinese; 4 pages—English.

* cited by examiner

*Primary Examiner* — Edwin A Young
(74) *Attorney, Agent, or Firm* — Andrew F. Young, Esq.; Lackenbach Siegel, LLP

(57) ABSTRACT

The invention relates to a revolving gear mechanism with at least two gear wheels which mesh mutually, forming an engagement space, of which one is a revolving gear wheel which is mounted rotatably by means of a bearing on a bolt, and a lateral surface of the bolt forms a bearing surface. According to the invention, at least one axial longitudinal groove is arranged on the lateral surface of the bolt.

19 Claims, 2 Drawing Sheets

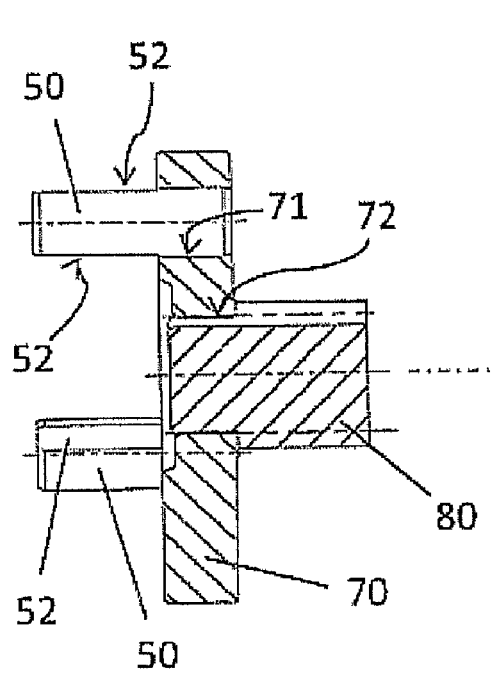
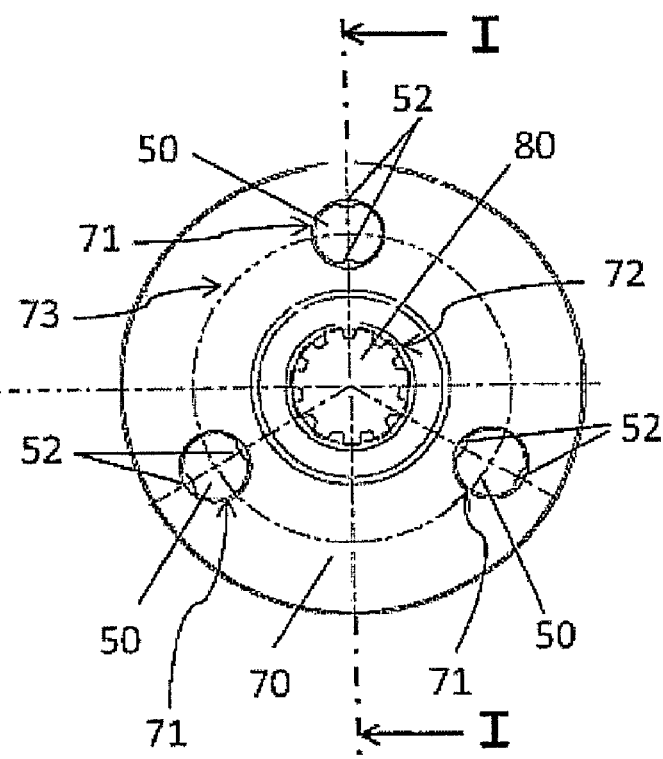
Fig. 1    Fig. 2
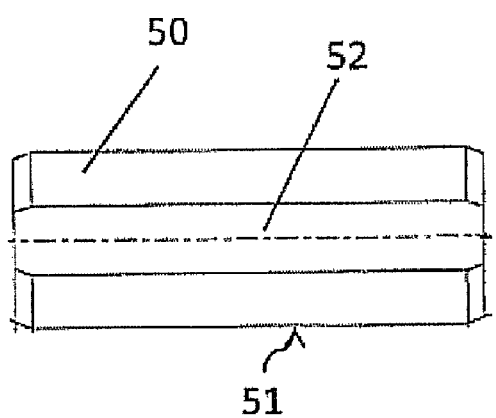
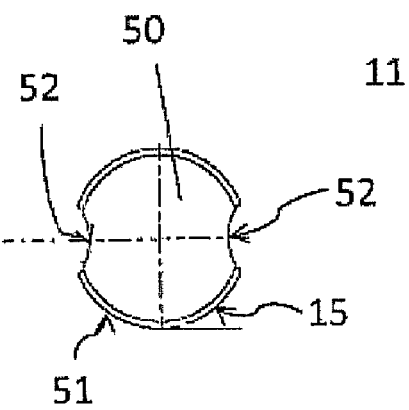
Fig. 3    Fig. 4

PLANET WHEEL WITH A BEARING BOLT THAT PRESENTS AN AXIAL GROOVE

CROSS REFERENCE TO RELATED APPLICATIONS

This application is related to, and claims priority from German Patent Application Serial No. 10 2009 010 001.6, filed Feb. 23, 2009, the entire contents of which is incorporated herein by reference.

FIGURE SELECTED FOR PUBLICATION

FIG. 5

BACKGROUND OF THE INVENTION

1. Field of the Invention

The present invention relates to a revolving gear mechanism with at least two mutually meshing gear wheels. More specifically, the present invention relates to a revolving gear mechanism with at least two mutually meshing gear wheels forming an engagement space, of which one is a revolving gear wheel which is mounted rotatably.

2. Description of the Related Art

The related art involves revolving gear mechanisms, such as planetary gears. The revolving gear wheels, or planet wheels, are mounted to bolts by means of slide bearings. During the operation of a planetary gear that has been lubricated with grease, there is a risk of increased wear of the bolt, as a result of insufficient lubrication, which has a negative effect on the service life of the toothed gearing.

From DE 10 2006 023 390 A1, a planet wheel is known, where the bolt is a hard metal bolt. The high hardness of such a hard metal bolt in connection with its high tenacity allows an operation that is more resistant to wear of the individual slide bearing.

Furthermore, from DE 10 2006 023 380 A1, a revolving gear mechanism with planet wheels is known, where the latter are each mounted by means of a sliding joint on a bolt. To connect this sliding joint with the engagement spaces of the toothing of the planet wheels with a ring gear, the planet wheels are provided with a radial through bore, in such a way that a lubricant, when the gear wheels roll off each other, is conveyed via this through bore into the sliding joint; as a result the wear of the slide bearing is reduced, and consequently the service life of the gear mechanism is increased.

What is not appreciated by the prior art is the reduction in service life associated with such prior art mechanisms.

Accordingly, there is a need for an improved revolving gear mechanism with at least two mutually meshing gear wheels, whose service life is further increased.

ASPECTS AND SUMMARY OF THE INVENTION

An aspect of the present invention is to provide an improved revolving gear mechanism with at least two mutually meshing gear wheels, whose service life is further increased.

According to an embodiment of the present invention, there is provided a revolving gear mechanism, with at least two gear wheels which mesh mutually, forming an engagement space, of which at least one is a revolving gear wheel which is mounted rotatably by means of a bearing on a bolt, and a lateral surface of the bolt forms a bearing surface, presents according to the invention at least one axial longitudinal groove which is arranged on the lateral surface of the bolt.

In a further embodiment of the present invention, the axial longitudinal groove serves as a grease reservoir for lubricating grease, which is filled at the time of the mounting of the revolving gear mechanism into these longitudinal grooves. During the operation of the revolving gear mechanism, the lubricating grease is conveyed out of this longitudinal groove into the sliding joint between the lateral surface of the bolt and the inner surface, and distributed uniformly there by the rotation of the planet wheel, thus eliminating the risk of insufficient lubrication, which increases the service life of the revolving gear mechanism by a factor of 2 to 3.

In another embodiment of the present invention, it is preferred for the axial longitudinal groove to be designed with a cross section in the shape of a segment of a circle, particularly a cross section in the shape of a half circle. However, it is also possible for the cross section to have a concave or convex shape, a V shape, or a U shape. Such longitudinal grooves can be produced in a simple way and thus cost effectively, without significantly increasing the total costs of the revolving gear mechanism according to the invention.

In another embodiment of the present invention, two axial longitudinal grooves are arranged diametrically opposite each other on the lateral surface of the bolt. This allows a reinforcement of the effect achieved by such a longitudinal groove, with regard to service life. The longitudinal grooves are arranged preferably in an area of the bolt that receives the planet wheel.

According to another embodiment of the present invention, the bolt(s) is (are) arranged in a planet carrier. Ideally, the bolt(s) is (are) then arranged in the planet carrier in such a way that the axial longitudinal groove or the axial longitudinal grooves of the bolt or of the bolts extend (extends) in radial alignment with the planet carrier. Thus, the longitudinal grooves extend with a 90° offset with respect to the torque transfer in the circumferential direction, which has no negative effect on the reversal backlash or on the cross section of the bolt that bears in the circumferential direction.

In a particularly preferred embodiment of the present invention, at least one bolt-mounted revolving gear wheel presents ideally at least one radial bore that is preferably arranged in its tooth root surface, which bore connects the engagement space of the mutually meshing gear wheels with the bearing of the revolving gear wheel, which achieves an additional increase in the service life of the revolving gear mechanism according to the invention. In the process, during the operation of the gear, the lubricating grease is pressed in the toothed engagement of the gear wheels through this radial bore in the planet wheels, in the direction of the bolt, and it can collect there in a longitudinal groove of the bolt that points radially outward, which effectively prevents insufficient lubrication. The service life of the revolving gear mechanism of this type can thus be increased once more by a factor of 2 to 3.

It is preferred for such a radial bore in the revolving gear wheel to present a diameter that is smaller than the separation of the root point-side end points of the revolving grooves of two mutually facing tooth flanks of the revolving gear wheel.

According to another embodiment of the present invention, this radial bore can also present a diameter that is greater than the modulus of the toothing of the revolving gear wheel.

Finally, according to another embodiment of the present invention, the revolving gear wheel meshes with a ring gear or a sun wheel.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 1 is a cross-sectional representation of a planet carrier of a revolving gear mechanism with an embodiment of the bolt according to the invention along the section I-I of FIG. 2.

FIG. 2 a top view of a planet carrier of a revolving gear mechanism with an embodiment example of a bolt according to the invention.

FIG. 3 a representation, in a side view, of the bolt according to FIGS. 1 and 2 mounted in the planet carrier.

FIG. 4 a front view of the bolt represented in FIG. 3.

DETAILED DESCRIPTION OF THE PREFERRED EMBODIMENTS

Figure 5:
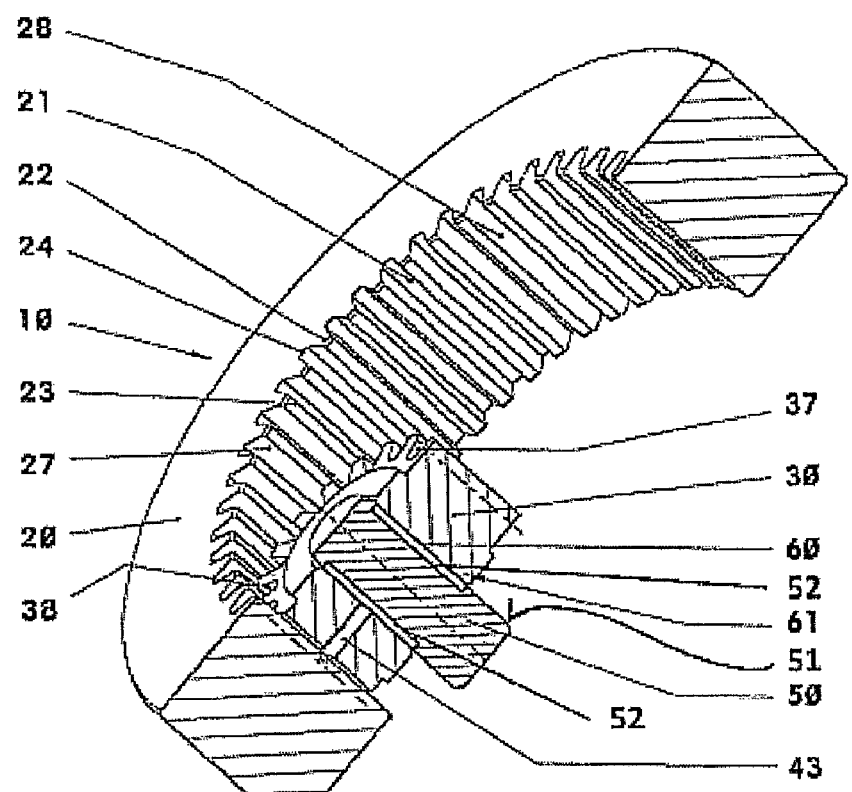
FIG. 5 a representation, in a partial perspective view, of a revolving gear mechanism with a bolt represented in FIGS. 1 to 3.

Reference will now be made in detail to several embodiments of the invention that are illustrated in the accompanying drawings. Wherever possible, same or similar reference numerals are used in the drawings and the description to refer to the same or like parts or steps. The drawings are in simplified form and are not to precise scale. For purposes of convenience and clarity only, directional terms, such as top, bottom, up, down, over, above, and below may be used with respect to the drawings. These and similar directional terms should not be construed to limit the scope of the invention in any manner. The words "connect," "couple," and similar terms with their inflectional morphemes do not necessarily denote direct and immediate connections, but also include connections through mediate elements or devices.

The planetary gear is a special design of a revolving gear mechanism, and it has three or more coaxially arranged axles. The basic construction design consists of a gear wheel set, which consists, from the inside toward the outside, of a sun wheel, the planet wheels that are carried by a planet carrier (also called "fixed link"), and a ring gear with internal toothing.

FIGS. 1 and 2 show such a planet carrier 70 of a planet wheel 30—represented in FIG. 5 in a partial perspective view—which is in engagement with a ring gear 20, and thus part of a revolving gear mechanism 10 that is designed as a planetary gear.

The basic design of this planet carrier 70 according to FIGS. 1 and 2 is disk-shaped with a central bore 72, for the purpose of connecting, by means of this central bore 72, the planet carrier 70 with a pinion 80, to use the planet carrier 70 as an output, for example, depending on the application. It is also possible to connect the planet carrier 70 firmly to the casing of the revolving gear mechanism 10, to use the gear as a stationary transmission.

About the central bore 72 of the planet carrier 70, three bores 71, which are offset in each case by 120° with respect to each other, are provided in the disk-shaped part of the planet carrier for the reception of the bolts 50, which function as bearing bolts for three planet wheels 30, of which only one planet wheel 30 is represented in FIG. 5.

Such a bolt 50, which functions as a bearing bolt for planet wheels, with two axial longitudinal grooves 52 arranged on its lateral surface 51, is shown in FIGS. 3 and 4 in a side view and a front view, where these longitudinal grooves 52 extend over the entire length of the bolt 50.

In FIGS. 1 and 2 as well, one can clearly see the axial longitudinal grooves 52 which are each arranged on a lateral surface 51 of each bolt 50 mounted in the planet carrier 70, where each bolt 50 presents two such longitudinal grooves 52. According to FIGS. 2 and 4, the two longitudinal grooves 52 of a bolt 50 are formed diametrically facing each other on its lateral surface 51, and they present a cross section in the shape of a segment of a circle. The bolts 50 can also be designed in such a way that the longitudinal grooves 52 do not extend over their entire length, as represented in FIG. 3, but only in the area of the planet wheel recess, i.e., not in the area of the bolt 50 that is firmly stopped in the planet carrier 70, as represented in FIG. 1.

According to FIG. 2, these bolts 50 are attached in such a way in the planet carrier 70, that the two longitudinal grooves 52 of each bolt 50 are in radial alignment with respect to the planet carrier 70.

These longitudinal grooves 52 function as a grease reservoir for lubricating grease, which is filled with lubricating grease during the mounting of the revolving gear mechanism 10. Because, during the operation of the revolving gear mechanism 10, the planet wheel 30 that is mounted to the bolt 50 rotates, the lubricating grease is conveyed, for the prevention of insufficient lubrication, out of this grease reservoir into the bearing of the planet wheel 30, as explained in reference to FIG. 5.

FIG. 5 shows a revolving gear mechanism 10 with a ring gear 20, and a planet wheel 30 which meshes with this ring gear 20; however, it does not show the associated planet carrier 70 according to FIGS. 1 and 2, which guides three planet wheels 30 of this revolving gear mechanism 10, nor an associated sun wheel. This revolving gear mechanism 10 thus presents a planetary gear with three axles and one fixed link. Such a planetary gear can also be designed so it has several fixed links, for example, as a combination with several planet sets.

The ring gear 20, the planet wheels 30 (of which only one is represented), and the sun wheel (not represented) are in a mutually coaxial arrangement, where the planet wheels 30 are arranged in each case at 120° with respect to each other on a common pitch circle 73 of a planet carrier 70 according to FIGS. 1 and 2. Each one of these planet wheels 30 is mounted rotatably on a bolt 50, where all three bolts 50 are designed according to FIG. 1 or FIG. 3, and stopped firmly in the planet carrier 70 according to FIGS. 1 and 2. Thus, the bolt 50 represented in FIG. 5 also presents two axial longitudinal grooves 52 which are arranged diametrically facing each other on its lateral surface 51, and designed so they extend over its entire length, or—as represented in FIG. 5—only in the area of the planet wheel recess. The function of these longitudinal grooves 52 as a grease reservoir to decrease insufficient lubrication has already been explained above.

The ring gear 20, the planet wheel 30, and the sun wheel, which is not represented, present, in this revolving gear mechanism 10, an involute toothing with a modulus of, for example, 0.8 mm. The internally toothed ring gear 20 has, for example, 48 teeth 22; the individual spur gear planet wheel 30 has 19 teeth 32, where the ring gear 20 is broader by, for example, 50%, then the planet wheel 30.

Figure 6:
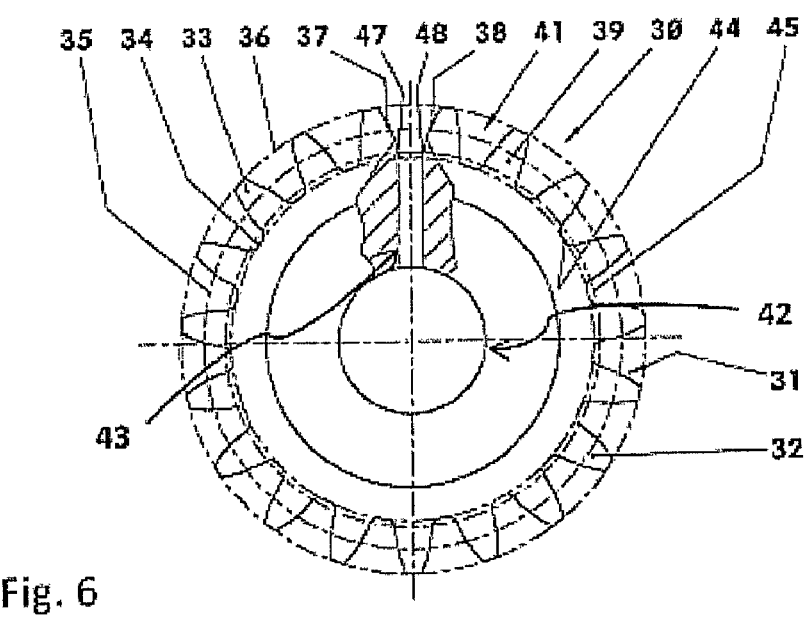
FIG. 6 a cross-sectional representation in the radial direction of the planet wheel according to FIG. 5.

The planet wheel 30 which is represented in the detail view of FIG. 6 has a length of, for example, 8.7 mm. The diameter of the addendum circle 36 is 15.9 mm with a tolerance of +0.1 mm.

The toothing length is here 1 mm shorter than the length of the planet wheel 30, whose toothing 31 has a round design to prevent edge loading of the planet wheel 30 in the ring gear 20. From the toothing data of the embodiment example, one gets a pitch circle diameter of the toothing 31 of 14.4 mm. The engagement angle of the toothing 31 is 20°, for example. The addendum of the individual tooth 32, i.e., the separation of the tooth tip 38 from the pitch circle 35, corresponds to the modulus of the planet wheel 30. The height of the tooth root surface 39, i.e., the separation of the tooth root surface 34 from the pitch circle 35, is greater by the bottom clearance than the modulus. The bottom clearance is, for example, one-fourth of the modulus.

To receive the bolt 50, the planet wheel 30 has a cylindrical through bore 42 which is oriented in its longitudinal direction, with, for example, a diameter of 5.03 mm, and a tolerance of +0.02 mm.

The planet wheel 30 represented in FIGS. 5 and 6 has, moreover, a radially oriented cylindrical bore 43 which connects the tooth root surface 34 with the through bore 42, and which presents a diameter of approximately 1 mm. The diameter of the bore 43 is thus greater than the modulus of the toothing 31. Instead of a single bore 43, the planet wheel 30 can present several such bores 43, which can be arranged with mutual offset in the same tooth root surface 34 or in different tooth root surfaces 34. Instead of cylindrical bores 43, conical bores can also be used, which narrow then from the tooth root surface 34 toward the through bore 42.

The through bore 42 can also be provided with a longitudinal or a spiral groove, which penetrates through the outlet of the radial bore 42.

The planet wheel 30 is manufactured from a case-hardened steel, for example, 16MnCr5, and it is case hardened after it has been manufactured. Bolt 50 has, at least in the area of the planet wheel recess, a cylindrical cross section of, for example, 5 mm, and it consists, for example, of a material manufactured by powder metallurgy, particularly steel. In the area of the planet wheel recess, the bolt 50 according to FIG. 5 presents the axial longitudinal grooves 52 which have already been described above, while in the area of the bolt 50 that is received by the planet carrier 70, these longitudinal grooves 52, according to FIG. 1, are not continued.

Before the mounting of the planet wheel 30 on the bolt 50, its longitudinal grooves 52 are filled with lubricating grease, and it is only then that the planet wheel 30 is shifted onto the bolt 50 and secured against axial shifting. The bolt 50 and the through bore 42 of the planet wheel 30 have clearance fit. After the mounting of the revolving gear mechanism is completed, the toothings 21 and 31 of the ring gear 20 and of the planet wheel 30 are lubricated with grease. If the planetary gear 10 is arranged in a casing, the gear can also be lubricated with an oil.

During the operation of the planetary gear 10, the wheel 30, for example, rolls off in the ring gear 20. In the process, a tooth flank 37 of the planet wheel 30 comes in contact with the tooth flank 27 of the ring gear 20, which points in the opposite direction—in the case of a pair of wheels represented for the sake of simplicity in one plane—at a point of the engagement line. When the planet wheel 30 rolls off, this point, the pitch point, is located close to the tooth foot 39, and when the ring gear 20 is stationary, it is close to the tooth tip 23. As the planet wheel 30 continues to turn, the instantaneous pitch point of the two tooth flanks 37 and 27 migrates along the revolving groove, when the planet wheel 30 rolls off in the direction of the tooth foot 39, and when the ring gear 20 is stationary, in the direction of the tooth tip 23. The length of the revolving groove is divided by the intersection of the pitch circles of the two toothings 21 and 31. As soon as the tooth tip 33 of the planet wheel 30 that is rolling off leaves the tooth flank 27 of the ring gear 20 that is stationary, the counter flank 38 of the tooth 32 of the planet wheel 30 that is rolling off engages with a counter flank 28 of the next tooth 22 of the stationary ring gear 20. In the process, there is no contact between the tooth tip 33 and the tooth root surface 24 of the ring gear 20. The new pitch point is located on the addendum circle 36 of the rolling off planet wheel 30, and close to the root circle of the stationary ring gear 20. As the planet wheel 30 that is rolling off continues to rotate, the instantaneous pitch point migrates along the new revolving groove in the direction of the root circle 44 of the planet wheel 30, and in the direction of the tooth tip 23 of the stationary ring gear 20.

As the planet wheel 30 and the ring gear 20 roll off, the planet wheel 30 rotates on the bolt 50, where, according to FIG. 5, the planet wheel 30 and the bolt 50 form a radial slide bearing 60 with a sliding joint 61.

The space that is enclosed by the tooth root surface 34 of the planet wheel 30 and the tooth tip 23 of the ring gear 20 as well as the revolving groove are referred to as the engagement space. As the gear wheels 20 and 30 roll off, the lubricant is distributed in the engagement space. As soon as the tooth space 41 of the planet wheel 30 rolls off over a tooth 22 of the ring gear 20, the lubricating grease is pressed into the radial bore 43, and lubricating grease that is already in the bore 43 is conveyed in the direction of the through bore 42 of the planet wheel 30 or of the bolt 50, which results in the lubricating grease collecting in the axial longitudinal grooves 52 of the bolt 50, and also penetrating from there into the sliding joint 61, where they can be distributed uniformly as a result of the rotations of the planet wheel 30 on the bolt 50. The resulting continuous lubrication prevents wear in the area of the sliding joint 61, which considerably increases the service life of the planetary gear 10. Furthermore, because the torque transfer in the case of the planetary gear occurs in the circumferential direction, while the longitudinal grooves 52 point radially outward, offset by 90°, neither the reversal backlash nor the cross section bearing in the circumferential direction of the bolt 50 are affected negatively.

Because of the large diameter of the bore 43 of the planet wheel 30, in the case of the planetary gear 10 described here, sufficient lubricant is always resupplied to the lubricating grease reservoirs formed by the longitudinal grooves 52, so that there is always enough lubricant available on the sliding joint 61. As an example, this bore 43 can also be designed with conical shape.

The maximum diameter of the bore 43 is limited by the separation between the root point-side end points 47 and 48 of the revolving grooves of two mutually facing tooth flanks 37 and 38 of the planet wheel 30. The separation between these end points 47 and 48 is greater than or equal to the separation between the intersections of the base circle 45 of the toothing 31 with the tooth flanks 37 and 38, which is 0.915 mm in this embodiment example.

The planetary gear 10 according to FIG. 5 can also be designed with a planet wheel 30 that does not present a radial bore 43. In this case, only the longitudinal grooves 52 of the bolt 50, which are used as lubricating grease reservoir, ensure a continuous lubrication of the sliding joint 61. Here too, the longitudinal grooves 52 must be filled with lubricating grease before mounting the planet wheel 30 on said bolt.

Because it is not possible, in this case, to resupply these longitudinal grooves 52 with lubricating grease, the service life is shorter in comparison to a planetary gear 10 with planet wheels 30 that present a radial bore 43; however, the service life is nevertheless still higher by a factor of 2 to 3 than without such longitudinal grooves 52.

In the claims, means or step-plus-function clauses are intended to cover the structures described or suggested herein as performing the recited function and not only structural equivalents but also equivalent structures. Thus, for example, although a nail, a screw, and a bolt may not be structural equivalents in that a nail relies on friction between a wooden part and a cylindrical surface, a screw's helical surface positively engages the wooden part, and a bolt's head and nut compress opposite sides of a wooden part, in the environment of fastening wooden parts, a nail, a screw, and a bolt may be readily understood by those skilled in the art as equivalent structures.

Having described at least one of the preferred embodiments of the present invention with reference to the accompanying drawings, it is to be understood that the invention is not limited to those precise embodiments, and that various changes, modifications, and adaptations may be effected therein by one skilled in the art without departing from the scope or spirit of the invention as defined in the appended claims.

What is claimed is:

1. A revolving gear mechanism comprising:
    (a) at least two gear wheels which mesh mutually, forming an engagement space, said engagement space for accepting a lubricant;
    (b) a bolt, wherein one of said gear wheels is a revolving gear wheel which is rotatably mounted by means of a bearing on said bolt;
    (c) a bearing surface, wherein a lateral surface of said bolt forms said bearing surface; and
    (d) at least one axial longitudinal groove is arranged on said lateral surface of said bolt resulting in at least one bolt-mounted gear wheel;
    wherein said at least one bolt-mounted gear wheel further comprises at least one radial bore which connects the engagement space of said at least one mutually meshing gear wheels with a corresponding bearing of said revolving gear wheel.

2. A revolving gear mechanism according to claim 1, wherein said axial longitudinal groove is designed with a cross section.

3. A revolving gear mechanism according to claim 2, wherein said cross section has a shape selected from the group comprising:
    (a) a segment of a circle;
    (b) a half circle;
    (c) a concave shape;
    (d) a convex shape; and
    (e) a V shape.

4. A revolving gear mechanism according to claim 2, wherein said axial longitudinal groove is provided in an area of said bolt which receives said revolving gear wheel.

5. A revolving gear mechanism according to claim 1, wherein said at least one axial longitudinal groove comprises two axial longitudinal grooves arranged diametrically opposite each other on said lateral surface of said bolt.

6. A revolving gear mechanism according to claim 1, wherein said bolt is arranged in a planet carrier.

7. A revolving gear mechanism according to claim 6, wherein said bolt is arranged in said planet carrier in such a way that said at least one axial longitudinal groove is in a radial alignment with respect to said planet carrier.

8. A revolving gear mechanism according to claim 1, wherein said bore is arranged in the tooth root surface of said revolving gear wheel.

9. A revolving gear mechanism according to claim 8, wherein the diameter of said at least one radial bore is smaller than a separation of two root point-side endpoints of a set of revolving grooves of two mutually facing tooth flanks of said revolving gear wheel.

10. A revolving gear mechanism according to claim 8, wherein the diameter of said bore is greater than the modulus of the toothing of said revolving gear wheel.

11. A revolving gear mechanism according to claim 10, wherein said revolving gear wheel meshes with a ring gear.

12. A revolving gear mechanism according to claim 10, wherein said revolving gear wheel meshes with a sun wheel.

13. A revolving gear mechanism according to claim 1, wherein said revolving gear wheel meshes with a ring gear.

14. A revolving gear mechanism according to claim 1, wherein said revolving gear wheel meshes with a sun wheel.

15. A revolving gear mechanism comprising:
    (a) at least two gear wheels which mesh mutually, forming an engagement space, said engagement space for accepting a lubricant;
    (b) a bolt, wherein one of said gear wheels is a revolving gear wheel which is rotatably mounted by means of a bearing on said bolt; and
    (c) a bearing surface, wherein a lateral surface of said bolt forms said bearing surface;
    (d) at least one axial longitudinal groove is arranged on said lateral surface of said bolt resulting in at least one bolt-mounted gear wheel; and
        (i) wherein said at least one axial longitudinal groove is provided in an area of said bolt which receives said revolving gear wheel, and
        (ii) wherein said at least one bolt-mounted gear wheel further comprises at least one radial bore which connects the engagement space of said at least one mutually meshing gear wheels with a corresponding bearing of said revolving gear wheel.

16. A revolving gear mechanism according to claim 15, wherein said at least one axial longitudinal groove comprises two axial longitudinal grooves arranged diametrically opposite each other on said lateral surface of said bolt.

17. A revolving gear mechanism according to claim 15, wherein said bolt is arranged in a planet carrier.

18. A revolving gear mechanism according to claim 15, wherein said revolving gear wheel meshes with a gear selected from the group comprising:
    (a) a ring gear; and
    (b) a sun wheel.

19. A revolving gear mechanism comprising:
    (a) at least two gear wheels which mesh mutually, forming an engagement space, said engagement space for accepting a lubricant;
    (b) a bolt, wherein one of said gear wheels is a revolving gear wheel which is rotatably mounted by means of a bearing on said bolt, wherein said bolt is arranged in a planet carrier, and wherein said revolving gear wheel meshes with a gear selected from the group comprising:
        (i) a ring gear; and
        (ii) a sun wheel;

(c) a bearing surface, wherein a lateral surface of said bolt forms said bearing surface;
(d) at least one axial longitudinal groove is arranged on said lateral surface of said bolt resulting in at least one bolt-mounted gear wheel;
wherein said at least one axial longitudinal groove is provided in an area of said bolt which receives said revolving gear wheel, and
wherein said at least one bolt-mounted gear wheel further comprises at least one radial bore which connects the engagement space of said at least one mutually meshing gear wheels with a corresponding bearing of said revolving gear wheel.

* * * * *

UNITED STATES PATENT AND TRADEMARK OFFICE
CERTIFICATE OF CORRECTION

PATENT NO.        : 8,272,990 B2  
APPLICATION NO.   : 12/635120  
DATED             : September 25, 2012  
INVENTOR(S)       : Hagedorn et al.

Page 1 of 1

It is certified that error appears in the above-identified patent and that said Letters Patent is hereby corrected as shown below:

Title page, item (75) Inventors: Erkan Poyraz, Donauschingen (DE); should be changed to --Donaueschingen--.

Signed and Sealed this  
Twenty-seventh Day of November, 2012

David J. Kappos  
*Director of the United States Patent and Trademark Office*